UNITED STATES PATENT OFFICE.

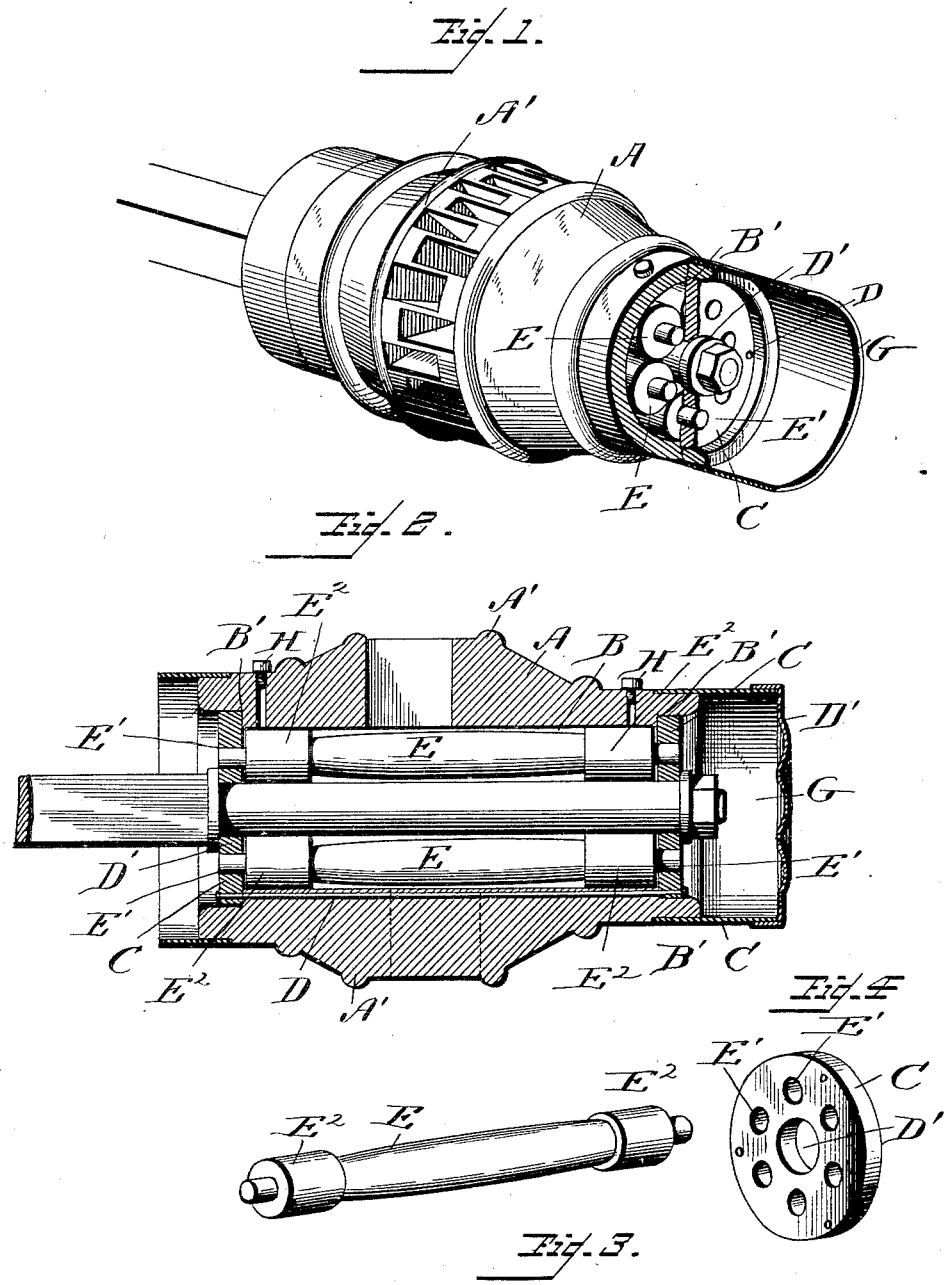

ALFRED AUGUSTUS MINOR, OF EGG HARBOR, WISCONSIN.

VEHICLE-WHEEL HUB.

SPECIFICATION forming part of Letters Patent No. 461,033, dated October 13, 1891.

Application filed June 10, 1891. Serial No. 395,777. (No model.)

*To all whom it may concern:*

Be it known that I, ALFRED AUGUSTUS MINOR, a citizen of the United States, residing at Egg Harbor, in the county of Door and State of Wisconsin, have invented certain new and useful Improvements in Vehicle-Hubs; and I do declare the following to be a full, clear, and exact description of the invention, such as will enable others skilled in the art to which it appertains to make and use the same, reference being had to the accompanying drawings, and to the letters of referenc marked thereon, which form a part of this specification.

This invention relates to certain new and useful improvements in vehicle-hubs; and it relates more particularly to that class of vehicle-hubs in which a series of friction-rollers is arranged within the hub.

The invention has for its object to simplify and cheapen the construction and to render more efficient in operation this class of vehicle-hubs. In this class of vehicle-hubs it has heretofore been proposed to arrange the friction-rollers within an axle-box which has been inserted within the hub, and it has in some cases been found necessary to change materially the construction of the axle in order to adapt it to use with the anti-friction hub.

My invention has for a further and more immediate object to provide an anti-friction vehicle-hub which may be used in connection with the vehicle-axles that are in common use without necessitating any change whatever in their construction. I dispense entirely with the axle-box heretofore used, arranging the rollers within the hub proper. The various parts are so constructed and arranged as to reduce to a minimum the friction and effectually prevent the endwise movement of the rollers.

To these ends and to such others as the invention may pertain the same consists in the peculiar construction and in the novel combination, arrangement, and adaptation of parts, all as more fully hereinafter described, shown in the accompanying drawings, and then specifically defined in the appended claim.

The invention is clearly illustrated in the accompanying drawings, which, with the letters of reference marked thereon, form a part of this specification, like letters of reference indicating like parts throughout the several views, and in which drawings—

Figure 1 is a perspective view of a vehicle-hub constructed in accordance with my invention, the same being shown as in place upon the axle and partly broken away in order to better illustrate the arrangement of the rollers. Fig. 2 is a vertical longitudinal section of the same. Figs. 3 and 4 are enlarged details in perspective of the caps or plates which form the bearings of the rollers and of one of the rollers, respectively.

Reference now being had to the details of the drawings by letter, A represents the body of the hub, which in its exterior form is in all respects similar to the vehicle-hubs as commonly constructed, excepting that it is provided with an annular raised portion A' to form a more secure seat for the spokes, as will be readily understood.

The interior of the hub is provided with an annular chamber B, open at the ends of the hub and of the same diameter throughout the entire length, excepting at its extreme en[ds] where the diameter of the chamber is [en]larged to form the shoulders B', as shown.

C C are metallic plates, which are sea[ted] within the ends of the hub, having a beari[ng] against the shoulders B'. These plates [are] connected by means of rods D and are [pro]vided with central openings D' for the [pas]sage of the axle, and surrounding this cen[tral] opening in each of the plates is a series [of] openings E', within which openings are jou[r]naled the ends of the rollers E. The sa[id] rollers E are provided at points adjacen[t] their ends with enlarged portions E², and [the] several rollers are arranged around the [inte]rior of the chamber B and together form [a di]rect bearing-surface for the axle. The [dis]tance between the said rollers should b[e as] slight as possible without being in actual [con]tact. The body portion of each of the ro[llers] is somewhat depressed or of less diam[eter] than the enlarged portions E², with th[e di]ameter at the longitudinal center slig[htly] greater than the diameter at points adja[cent] to the enlarged portions, as shown.

It is my purpose to manufacture the b[ody] of the hub and the several parts of the s[ame] of metal, and I prefer the use of metal in connection, though it is at once evident that wood or other material may, if preferred, be employed.

It will be at once evident that a vehicle-hub constructed in accordance with my invention will be both strong and durable, wear due to friction between the parts will be reduced to a minimum, and the manner in which the rollers are journaled within the hub will serve to prevent possible displacement when in use, and yet will permit of ready access to them in case it is necessary either for cleaning or repairing. The ends of the rollers will be concealed from view by the cap G, and the general appearance of the hub when in use will be identical with that of an ordinary hub. For convenience in oiling I have provided oil-openings H, which may be provided with any form of caps or covers which may be found to be adapted to the purpose.

Having thus described my invention, what I claim to be new, and desire to secure by Letters Patent, is—

The combination, with the body of the hub provided upon its interior with annular chamber enlarged at the ends to form shoulders B', of the end plates seated in the enlarged ends of the chambers of the hub and bearing against said shoulders, rods connecting said plates, said plates having central openings for the passage of the axle, and the longitudinal rollers journaled at their ends in said plates and near their ends having enlarged portions, with the body portion reduced between the enlarged portions and tapered from the center toward the enlarged ends, substantially as shown and described.

In testimony whereof I affix my signature in presence of two witnesses.

ALFRED AUGUSTUS MINOR.

Witnesses:
EDNA VINCENT,
M. E. LYMAN.